(12) United States Patent
Giannotta

(10) Patent No.: US 9,383,024 B2
(45) Date of Patent: Jul. 5, 2016

(54) VALVE

(75) Inventor: Salvatore Giannotta, Maincy (FR)

(73) Assignee: SNECMA, Paris (FR)

( * ) Notice: Subject to any disclaimer, the term of this patent is extended or adjusted under 35 U.S.C. 154(b) by 666 days.

(21) Appl. No.: 13/988,172

(22) PCT Filed: Nov. 8, 2011

(86) PCT No.: PCT/FR2011/052607
§ 371 (c)(1),
(2), (4) Date: May 17, 2013

(87) PCT Pub. No.: WO2012/066216
PCT Pub. Date: May 24, 2012

(65) Prior Publication Data
US 2013/0230389 A1   Sep. 5, 2013

(30) Foreign Application Priority Data
Nov. 18, 2010  (FR) ..................... 10 59478

(51) Int. Cl.
*F16K 17/02* (2006.01)
*F15B 15/28* (2006.01)
*F16K 31/122* (2006.01)
*F16K 37/00* (2006.01)

(52) U.S. Cl.
CPC ............. *F16K 17/02* (2013.01); *F15B 15/2838* (2013.01); *F16K 31/1221* (2013.01); *F16K 37/0066* (2013.01); *Y10T 137/0396* (2015.04); *Y10T 137/7793* (2015.04)

(58) Field of Classification Search
CPC ......... F01D 11/14; F01D 11/20; F01D 11/22; F16K 17/02; F16K 31/1221; F16K 37/0066; F15B 15/2838
See application file for complete search history.

(56) References Cited

FOREIGN PATENT DOCUMENTS

| DE | 11 17 960 | 11/1961 |
| FR | 2 794 196 | 12/2000 |
| WO | 2010 022746 | 3/2010 |

OTHER PUBLICATIONS

International Search Report Issued Jan. 20, 2012 in PCT/FR11/52607 Filed Nov. 8, 2011.

*Primary Examiner* — Nathaniel Wiehe
*Assistant Examiner* — Cameron Corday
(74) *Attorney, Agent, or Firm* — Oblon, McClelland, Maier & Neustadt, L.L.P.

(57) ABSTRACT

A valve, for example for controlling a clearance at a tip of turbine blades, includes a piston and a supply mechanism supplying fluid under pressure to cause the piston to move inside a hollow body, and a mechanism detecting a position of the piston, including a shut-off element that moves as one with the piston and is mounted such that it can move in a fluid passage between two positions, open and closed respectively, the fluid passage connecting the supply mechanism to a pressure sensor that generates an output signal representative of the position of the piston of the valve.

9 Claims, 3 Drawing Sheets

VALVE

The invention relates to a valve and particularly a valve for controlling a clearance at the tip of turbine blade, along with a turbine engine equipped with such a valve.

Conventionally, the air supplying a turbine engine flows from upstream to downstream via a low and high-pressure compressor, and then inside a combustion chamber wherein the outlet supplies a high-pressure turbine driving the high-pressure compressor followed by a low-pressure turbine driving the low-pressure compressor.

The high-pressure turbine generally comprises a wheel with movable blades situated between two upstream and downstream annular rows of fixed blades borne by an external casing, a small radial clearance being provided between the tips of the movable blades and the external casing.

During turbine machine operation, it is important to minimize the radial clearance at the tip of the turbine blades to prevent air leaks and ensure maximum turbine engine performance.

The prior art includes devices for controlling the clearances at the tip of blades, comprising means for extracting cooling air in a part of the high-pressure compressor. An air extraction circuit extends to the turbine and is split into two passages, wherein a first supplies an upstream annular cavity encompassing an external casing of the high-pressure turbine and a second supplies a downstream cavity encompassing a row of fixed blades at the high-pressure turbine outlet. The blades of the latter row comprise channels connected at the inlet to the downstream cavity and opening at the outlet at the trailing edge of the blades.

A check valve is mounted in the air extraction circuit and can adopt an open position wherein the air circulates in the first passage, the second passage being sealed by the check valve, and a closed position wherein the air circulates in the second passage, the first passage being shut off. Said two cavities are connected to each other such that when the check valve is open, the air from the high-pressure compressor enables cooling of the external casing of the high-pressure turbine and gives rise to pressurization of the downstream cavity of the external casing of the low-pressure turbine. When the check valve is in the closed position, some of the air circulates from the downstream cavity to the upstream cavity for the pressurization thereof.

With such an assembly, it is possible to control the cooling air supply of the external casing of the high-pressure turbine and thus control the heat expansion thereof and as such the clearances at the tip of turbine blades.

It may arise that the check valve of the control circuit thereof becomes jammed, which may cause either overconsumption of fuel due to a large clearance at the tip of blades if the check valve is jammed in the closed position or premature wear of the tips of blades and the casing coming in contact together due to excessive cooling of the casing when the check valve is jammed in the open position. In this way, to ensure optimum control of the clearances at the tip of turbine blades, it is necessary to ascertain the position of the check valve.

However, in this known assembly, the upstream and downstream faces of the check valve continue to be subject to the pressure of the air from the high-pressure compressor since the two upstream and downstream cavities are interconnected, such that it is not possible to detect the position of the check valve with a mere differential pressure measurement between the upstream and downstream faces of the check valve.

In a known manner, the check valve is in the form of a flap valve, wherein opening and closure are controlled by means of a servovalve arranged in a fuel circuit. The position of the flap valve is determined by means of LVDT (linear variable differential transformer) type position sensors suitable for determining the position of the flap valve. The degree of opening of the flap valve is controlled by a turbine engine computer.

However, this type of control is difficult to implement in that controlling the degree of opening of the flap valve requires a specific software development. Furthermore, LVDT sensors are costly. Finally, the use of a hydraulic fuel circuit requires the installation of complex branch connection pipes for supplying fuel to the servovalve and the use of costly seals.

The aim of the invention is particularly that of providing a simple, effective and economical solution for this problem.

For this purpose, it relates to a valve comprising a piston slidably mounted in a hollow body, a rod rigidly connected to the piston and intended to be connected to a movable member, means for supplying the hollow body with pressurized fluid for moving the piston in the hollow body between an initial position and a final position and means for returning the piston to the initial position when the fluid pressure is less than a given pressure, characterized in that it comprises means for detecting the position of the piston, said detection means comprising a shut-off element which moves as one with the piston and is mounted such that it can move in a fluid passage between two positions, open and closed, of the fluid passage, the fluid passage being connected via one end to the means for supplying the hollow body with pressurized fluid and via another end to a pressure sensor generating an output signal representative of the position of the piston of the valve.

According to the invention, the movement of the piston induces a simultaneous movement of the shut-off element enabling opening or closure of a fluid passage, the output fluid pressure of the passage being detected by a pressure sensor thus enabling reporting of the position of the shut-off element and thus of the piston. In this way, when the piston rod is connected for example to a movable member for opening and closing an air supply for controlling the clearances at the tips of blades in a turbine, it is possible to deduce the position of the movable member on the basis of that of the piston.

The valve according to the invention is particularly advantageous when applied to the control of a clearance at the tip of turbine blades in a turbine engine.

Incorporating a shut-off element in a passage connected to a pressure source makes it possible to avoid the use of costly LVDT sensors since the detection is carried out by means of a pressure measurement.

According to a further feature of the invention, the valve comprises a chamber containing a rod rigidly connected to the valve piston and extending coaxially with the piston, the chamber having an inlet port connected to the pressurized fluid supply means and an outlet port concealed by the rod when the piston is in the initial position and revealed when the piston is in the final position, the outlet port being connected to the pressure sensor.

In this configuration, the rod blocks the application of pressure towards the pressure sensor while it shuts off the outlet port of the passage. When the rod opens the passage, the pressure sensor detects an increase in the fluid pressure, indicating that the piston is in the final position.

In one embodiment of the invention, the rod contained in the chamber extends from the piston to opposite the rod connected to the movable member.

In one alternative embodiment of the invention, the rod contained in the chamber is the rod connected to the movable member and bears a shut-off element mentioned above formed by an annular collar of the rod inside the chamber, thus enabling the use of the piston rod as a supporting member of the shut-off element and avoids mounting a further rod on the piston.

Advantageously, the chamber is outside the hollow body containing the piston and is supported by a rear wall of the hollow body.

In a further alternative embodiment of the invention, the fluid passage comprises the hollow body wherein the piston acts as a tight separating element between a port of the hollow body connected to the pressurized fluid supply means and a port of the hollow body connected to the pressure sensor, these two ports of the hollow body being connected to each other when the piston is in the vicinity of the final position thereof.

The invention also relates to a turbine engine, such as an aircraft turbojet, characterized in that it comprises at least one valve as described above.

In this turbine engine, the supply means are connected to means for extracting pressurized air on a stage of a compressor, for example high-pressure, and the pressure sensor is positioned in the vicinity of a fan at the upstream end of the turbine engine.

The pressurized fluid supplying the valve is thus air extracted in the turbine engine compressor, preventing the branch connection of a portion of the pressurized fuel for supplying the valve and the use of special seals as in the prior art. Finally, incorporating the pressure sensor in the vicinity of the fan prevents the sensor from being subject to high temperatures liable to affect the operation thereof.

The invention further relates to a procedure for detecting jamming of the piston in a valve as described above, characterized in that it comprises steps consisting of:
a) supplying the hollow body with fluid at a pressure less than the given pressure for moving the piston;
b) comparing the pressure value measured by the sensor to the hollow body supply pressure and inferring whether the piston is jammed in the open position;
c) if the pressure measured by the sensor is zero, increasing the hollow body supply pressure at least to the given pressure for moving the piston;
d) comparing the new pressure value measured by the pressure sensor to the hollow body supply pressure and inferring whether the piston is jammed in the closed position.

If the pressure measured by the pressure sensor during step b) is equal to the hollow body supply pressure which is less than the pressure for moving the piston, this means that the passage inlet and outlet are connected and the piston is jammed in the open position. Otherwise, the pressure measured by the pressure sensor is zero and the pressure is increased to the pressure for moving the piston. If the pressure measured by the sensor remains zero, it is inferred that the piston is jammed in the closed position. Otherwise, the piston indicates a pressure equal to the hollow body supply pressure, making it possible to infer that the piston is operating normally.

Further advantages and features of the invention will emerge on reading the description hereinafter given as a non-limiting example with reference to the appended figures wherein.

Figure 1:
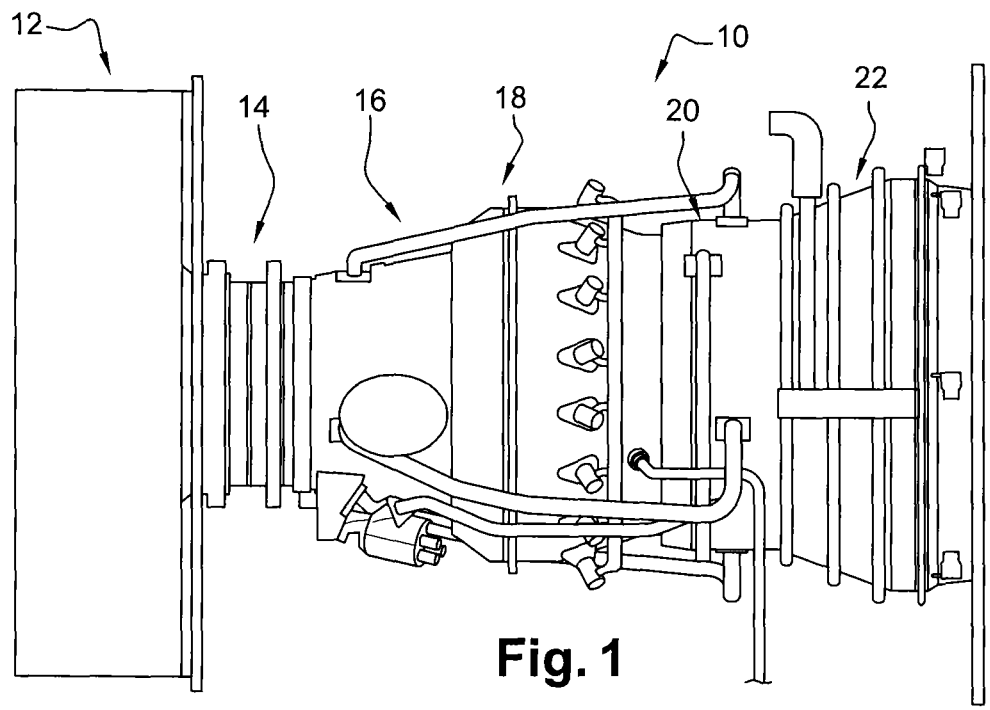
FIG. 1 is a schematic side view of a turbine engine according to the prior art.

Reference is first made to FIG. 1 representing a turbine engine 10 essentially comprising, from upstream to downstream, a fan 12 supplying an air flow divided into a secondary air flow bypassing the turbojet and a primary air flow circulating inside a low-pressure compressor 14 and a high-pressure compressor 16 and supplying a combustion chamber 18. The gases produced during combustion are discharged into a high-pressure turbine 20 wherein the rotor actuates the high-pressure compressor rotor. The hot gases then circulate in a low-pressure turbine 22 wherein the rotor actuates the low-pressure compressor rotor.

Figure 2:
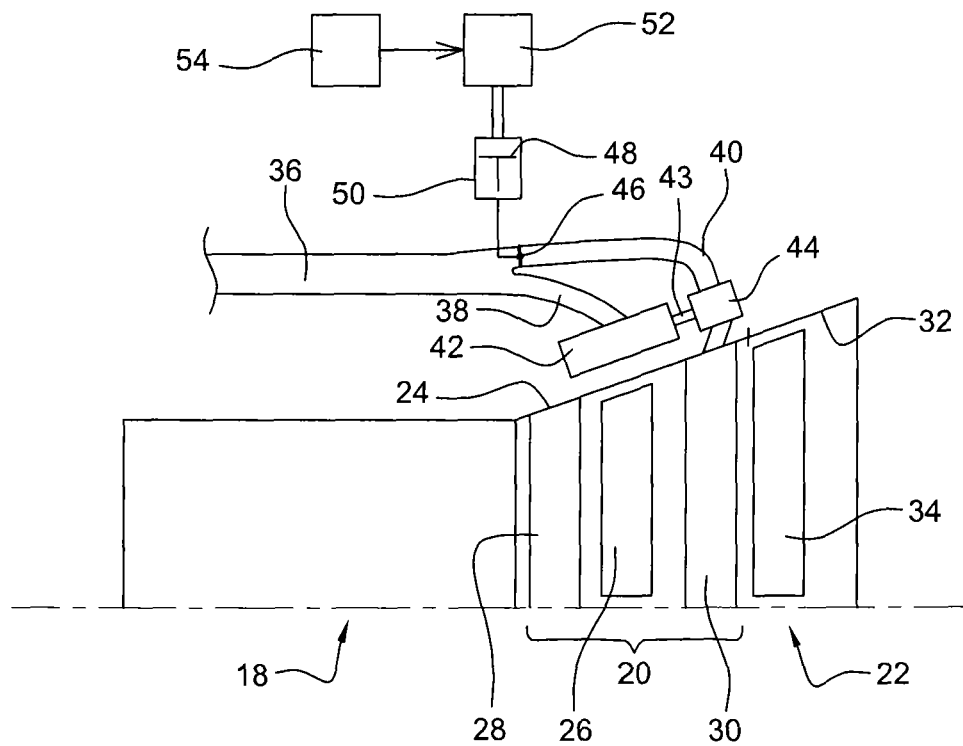
FIG. 2 is an axial section schematic half-view of the downstream part of the turbine engine in FIG. 1.

As shown in FIG. 2, the high-pressure turbine 20 is arranged at the outlet of the combustion chamber 18 and comprises an external casing 24 externally defining the flow stream of the combustion gases wherein a bladed wheel 26 mounted between an upstream fixed blade distributor 28 and a downstream distributor 30 rotates. The low-pressure turbine 22 comprises an external casing 32 encompassing an alternation of distributors and turbine wheels wherein only the first wheel 34 can be seen in FIG. 2.

The turbine engine comprises means for controlling the clearances at the tip of the high-pressure turbine blades. These means comprise means for extracting air on the high-pressure compressor, comprising a passage 36 wherein the upstream end is connected to a stage of the high-pressure compressor and wherein the downstream end is divided into two channels 38, 40 supplying upstream 42 and downstream annular cavities 44 formed about the external casing 24 of the high-pressure turbine. The downstream cavity supplies channels (not shown) formed in the fixed blades of the distributor 30, these channels opening at the outlet at the trailing edge of the fixed blades. These channels are suitable for cooling the blades of the distributor 30 subjected to the hot gases from the combustion chamber. The control means also comprise a check valve 46 actuated for moving between open and closed positions by a piston 48 slidably mounted in a hollow body 50 supplied with pressurized fluid by a secondary fuel circuit of the fuel circuit supplying the combustion chamber in a manner well-known to those skilled in the art. The hollow body is supplied with pressurized fluid via a servovalve 52 controlled by a computer 54.

The open position of the check valve 46 corresponds to a position wherein the air from the high-pressure compressor is routed to the annular cavity 42 about the external casing 24 of the high-pressure turbine 20 and the closed position corresponds to a position wherein the air circulates to the annular cavity 44.

The two cavities 42, 44 are interconnected via a channel 43, for pressurizing the downstream cavity by means of the upstream cavity when the check valve is in the open position and for pressurizing the upstream cavity by means of the downstream cavity when the check valve is in the closed position.

According to the flight phases, the computer 54 actuates opening and closure of the servovalve 52 which actuates the movement of the piston 48 and subsequently the check valve 46. In this way, this arrangement optionally enables an air supply to the annular cavity 42 formed about the external casing 24 of the high-pressure turbine 20 for cooling the external casing more or less and thus controlling the clearances at the tips of high-pressure turbine blades.

The position of the check valve 46 is determined by LVDT type movement sensors.

However, LVDT sensors are very costly and installing a fuel branch circuit for supplying the piston 48 with pressure is difficult to carry out. Furthermore, the difference in pressure between the upstream and downstream faces of the check valve 46 is substantially identical regardless of whether the check valve is in the open position or in the closed position in that the upstream and downstream cavities are interconnected, meaning that it is not possible to envisage detection of the position of the check valve by means of differential pressure measurement between the upstream and downstream faces of the check valve 46.

The invention provides a solution to these problems and to those mentioned previously using an on-off valve controlled with pressurized air and incorporation means for detecting the position of the piston.

In this way, the valve 56 according to the invention is an on-off valve comprising a hollow body 58 wherein a piston 60 connected to an axial rod 62 extending via a port 65 of a rear wall of the body 58 is slidably mounted. The rod is connected to a check valve as described above opening in an initial position of the piston 60 (FIG. 3A) and closing in a final position of the piston 60 (FIG. 3B), a conduit connected to the air extraction means on a stage of the high-pressure compressor. The hollow body 58 comprises a pressurized fluid inlet port 64 opening into the hollow body 58 on the side of an upstream face 63 of the piston 60 opposite the downstream face 66 connected to the rod 62.

Means for returning the piston to the initial position are arranged between the downstream face 66 of the piston 60 and the rear wall 68 of the hollow body 58 comprising the port 65 for inserting the rod 62.

Figure 3A:
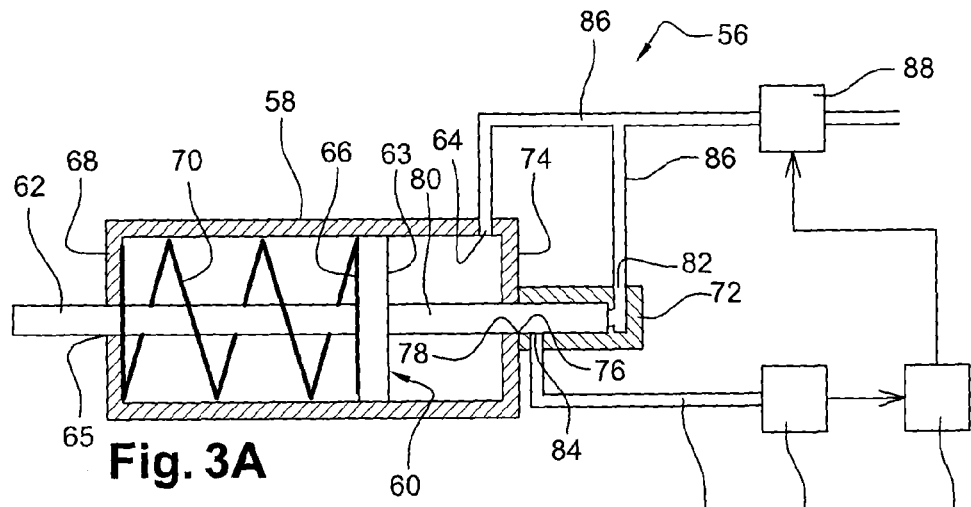
FIGS. 3a and 3b are schematic views of a valve according to the invention in the open and closed position, respectively.

In the embodiments shown in the figures, the return means comprise a spring 70 working in compression. This spring 70 is in the relaxed position when the piston 60 is in the initial position (FIG. 3A). The rigidity of the spring 70 is determined to enable a return of the piston 60 to the initial position (FIG. 3A) when the fluid pressure is less than a given value.

A chamber 72 with a cylindrical internal cavity is mounted outside the hollow body and is attached to the rear wall 74 of the hollow body 58 on the side opposite the rod 62. This chamber 72 comprises an axial port 76 aligned with an axial port 78 of the rear wall 74. A second rod 80 with a cylindrical cross-section, coaxial with the rod 62 slidably extends by one end in the chamber 72 via the ports 76, 78 of the hollow body 58 and the chamber 72 and is rigidly connected to the upstream face 63 of the piston 60 by the opposite end thereof.

The chamber 72 comprises two axially spaced radial ports 82, 84, of which one 82 is a pressurized fluid inlet port and the other 84 is a pressurized fluid outlet port. The free end of the second rod 80 mounted inside the chamber 72 shuts off the outlet port 84 while the piston 60 is not in the final position.

The port 64 of the hollow body 58 and the port 82 of the chamber 72 are connected by passages 86 to a servovalve 88 controlled by a turbine engine computer 90. The outlet port 84 of the chamber 72 is connected by a passage 92 to a pressure sensor 94 connected to the turbine engine computer 90.

The servovalve 88 is supplied with pressurized air extracted on the turbine engine compressor.

In operation, the computer 90 actuates the opening of the servovalve 88 enabling pressurized air to be supplied to the hollow body 58. Under the effect of pressure, the piston 60 moves from the initial position (FIG. 3A) to the final position (FIG. 3B) and actuates the movement of the second rod 80 wherein the free end frees the outlet port 84 of the chamber 72, such that the supply pressure of the valve 56 is applied to the pressure sensor 94 which detects the pressure and transmits corresponding information to the computer 90.

The pressure sensor 94 has no difficulty detecting this pressure, varying from 0 to 30 bar, for supplying the valve 56.

Advantageously, the sensor 94 is in the vicinity of the fan 12 so as not to be subjected to high temperatures liable to prevent the operation thereof.

Figure 4A:
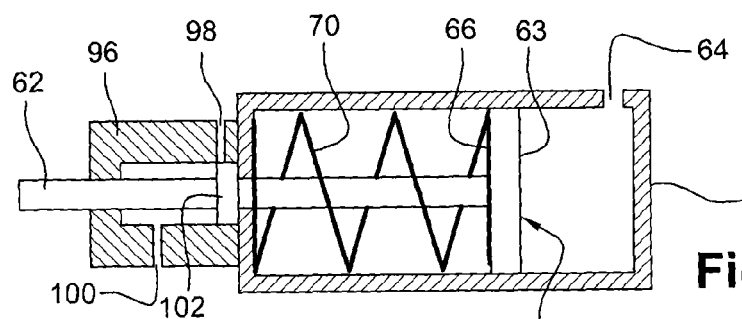
FIGS. 4a and 4b are schematic views of a second embodiment of the invention in the open and closed position, respectively.
Figure 4B:
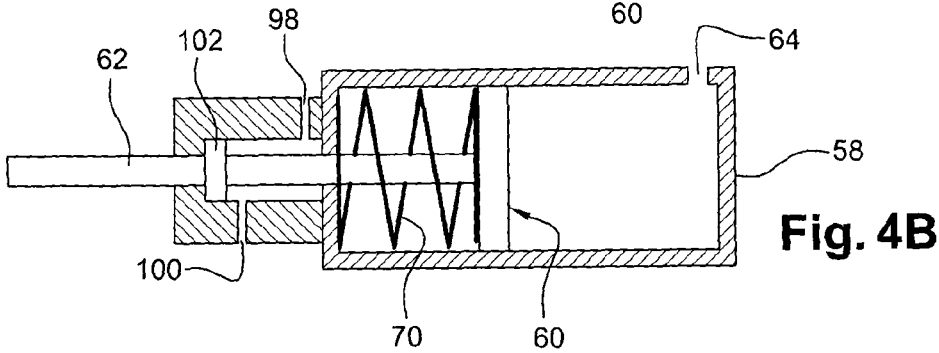

In one alternative embodiment of the invention represented in FIGS. 4A and 4B, a detection chamber 96 is attached to the wall 68 traversed by the rod 62. The rod 62 passes through the chamber 96 which comprises a pressurized air radial inlet port 98 and a radial outlet port 100 connected to the pressure sensor 94. A shut-off element 102 of the outlet port 100 is formed by an annular collar of the rod 62 and is situated inside the chamber 96. The radial dimension of the annular collar 102 is such that it slides tightly inside the chamber 96. This annular collar 102 is positioned on the rod 62 such that, while the piston 60 has not reached the final position thereof, application of the fluid pressure to the pressure sensor 94 is blocked.

Figure 5A:
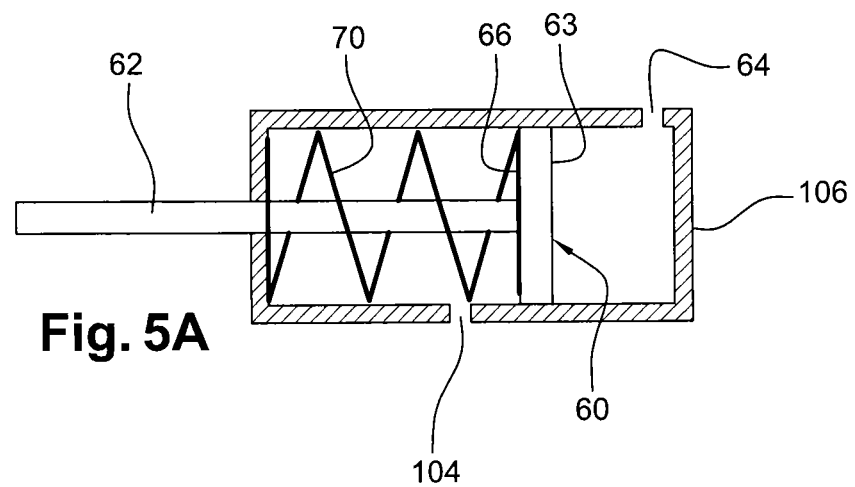
FIGS. 5a and 5b are schematic views of a third embodiment of the invention in the open and closed position, respectively.
Figure 5B:
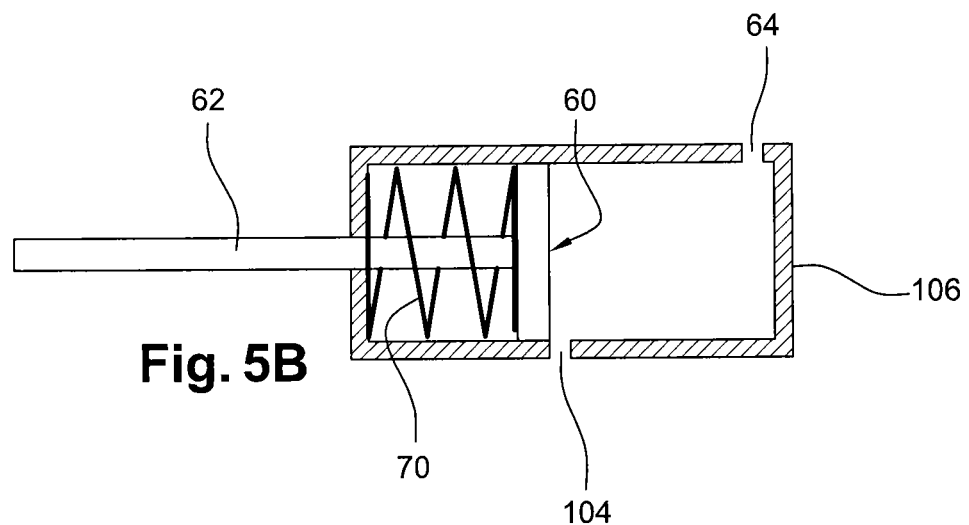

In a third embodiment of the invention represented in FIGS. 5A and 5B, the hollow body 106 acts as the detection chamber and the piston 60 acts as the shut-off element for applying pressure to the pressure sensor. A radial outlet port 104 connected to the sensor is thus formed in the hollow body at the downstream end in relation to the inlet port 64 and is axially offset in relation to this inlet port by a distance of not more than the travel of the piston 60 in the hollow body 58. The piston 60 is thus inserted between the inlet port 64 and the outlet port 104 in the initial position and passes the outlet port 104 in the final position, which is then supplied with pressurized fluid.

Figure 3B:
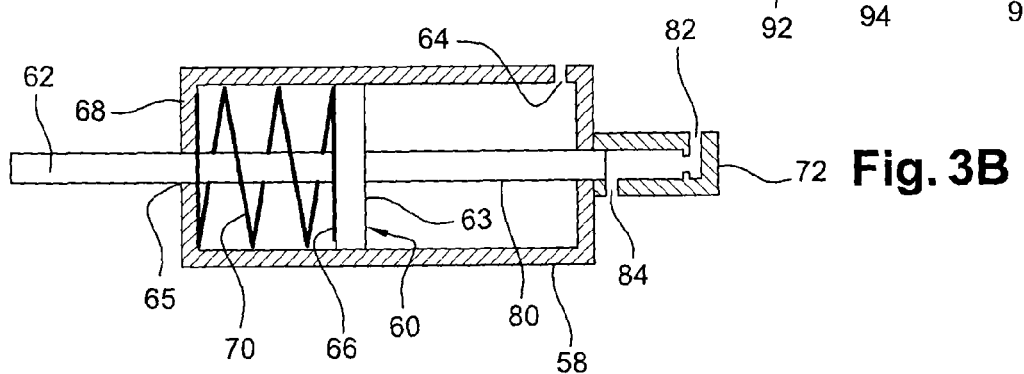

In one alternative embodiment of the invention shown in FIGS. 3A and 3B, the second rod 80 could comprise a shut-off element such as an annular collar, in a similar manner to that described with reference to FIGS. 4A and 4B.

Jamming of the check valve or piston 60 can also be detected simply using a particular checking procedure consisting firstly of supplying the hollow body 58, 106 with fluid having a pressure less than the given pressure for moving the piston 60 so as not to cause movement of the piston 60. The pressure value measured by the sensor 94 is then compared to the supply pressure value. If the value measured by the sensor 94 is equal to the supply pressure valve, it is inferred that the inlet 82, 98, 64 and outlet 84, 100, 104 of the chamber 72, 96, 106 are connected and that the piston 60 is jammed in the open position. Otherwise, the pressure measured by the sensor 94 is zero and the piston 60 is in the closed position. If the supply pressure is then increased to a value greater than or equal to the given pressure required for moving the piston 60 and if the pressure measured by the sensor 94 remains zero, it is inferred that the piston 60 is thus jammed in the closed position.

This procedure for checking the jamming state of the piston may be performed when idling on the ground before takeoff or after landing.

While the valve according to the invention is particularly advantageous when used for controlling clearances at tips of turbine blades in a turbine engine, it can also be used in other technical fields whenever the position of a movable member actuated by a piston needs to be determined.

The invention claimed is:
1. A valve comprising:
a piston slidably mounted in a hollow body;

a first rod rigidly connected to the piston and configured to be connected to a movable member;

means for supplying the hollow body with pressurized fluid for moving the piston in the hollow body between an initial position and a final position;

means for returning the piston to the initial position when the fluid pressure is less than a given pressure; and means for detecting a position of the piston, the means for detecting comprising a shut-off element that moves as one with the piston and is mounted such that it can move in a fluid passage between two positions, open and closed, of the fluid passage, the fluid passage being connected via one end to the means for supplying the hollow body with pressurized fluid and via another end to a pressure sensor generating an output signal representative of the position of the piston of the valve.

2. A valve according to claim 1, further comprising a chamber including a second rod rigidly connected to the piston of the valve and extending coaxially with the piston, the chamber including an inlet port connected to the pressurized fluid supply means and an outlet port concealed by the second rod when the piston is in the initial position and revealed when the piston is in the final position, the outlet port being connected to the pressure sensor.

3. A valve according to claim 2, wherein the second rod included in the chamber is the first rod connected to the movable member and bears the shut-off element which is formed by an annular collar of the second rod inside the chamber.

4. A valve according to claim 2, wherein the second rod included in the chamber extends from the piston opposite the first rod connected to the movable member.

5. A valve according to claim 2, wherein the chamber is outside the hollow body including the piston and is supported by a rear wall of the hollow body.

6. A valve according to claim 1, wherein the fluid passage comprises the hollow body, wherein the piston acts as a tight separating element between a port of the hollow body connected to the pressurized fluid supply means and a port of the hollow body connected to the pressure sensor, the two ports of the hollow body being connected to each other when the piston is in the vicinity of the final position thereof.

7. A turbine engine, or an aircraft turbojet, comprising at least one valve according to claim 1 for controlling a clearance at a tip of turbine blades.

8. A turbine engine according to claim 7, wherein the supply means is connected to means for extracting pressurized air on a stage of a compressor, or high-pressure stage of a compressor, and the pressure sensor is positioned in a vicinity of a fan at an upstream end of the turbine engine.

9. A procedure for detecting jamming of the piston in the valve according to claim 1, comprising:
a) supplying the hollow body with fluid at a pressure less than a given pressure for moving the piston;
b) comparing a pressure value measured by the pressure sensor to supply pressure of the hollow body and inferring whether the piston is jammed in the open position;
c) when the pressure measured by the pressure sensor is zero, increasing the supply pressure of the hollow body at least to the given pressure for moving the piston;
d) comparing a new pressure value measured by the pressure sensor to the supply pressure of the hollow body and inferring whether the piston is jammed in the closed position.

* * * * *